Feb. 6, 1940.   G. E. ROWE   2,189,271
FOREHEARTH FOR AND METHOD OF CONTROLLING THE TEMPERATURE
AND CONDITION OF MOLTEN GLASS
Filed April 16, 1937   2 Sheets-Sheet 1
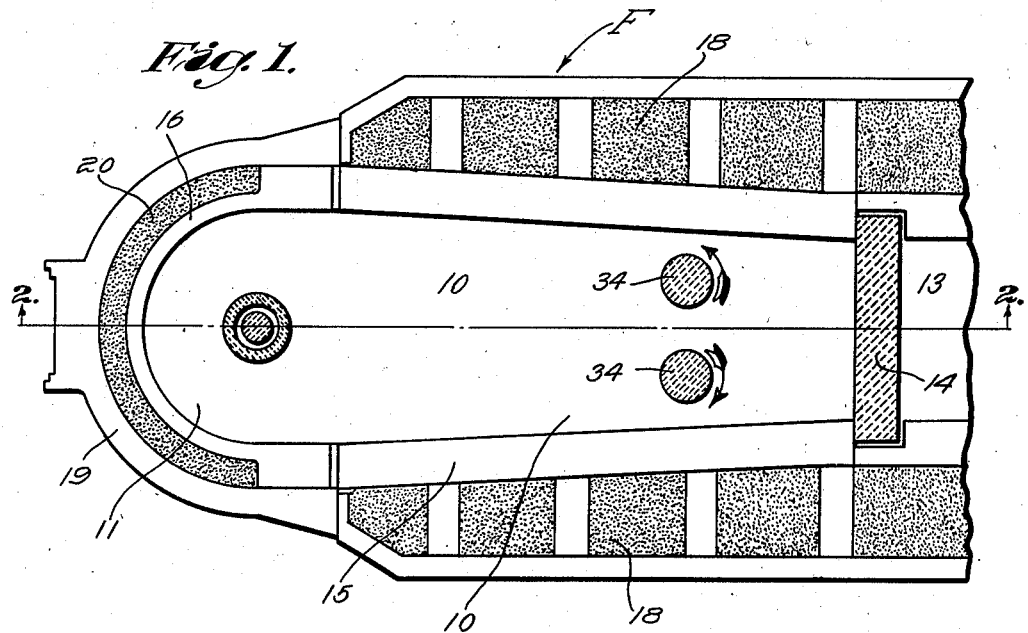
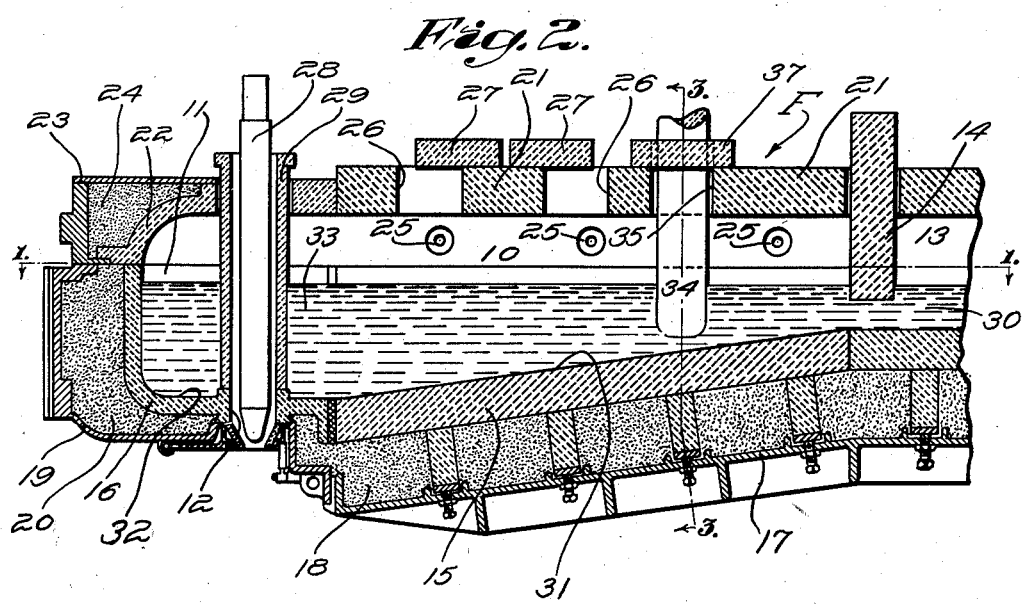
Inventor;
George E. Rowe
by Brown & Parham
Attorneys
Witness;
W. B. Thayer.

Feb. 6, 1940.   G. E. ROWE   2,189,271
FOREHEARTH FOR AND METHOD OF CONTROLLING THE TEMPERATURE
AND CONDITION OF MOLTEN GLASS
Filed April 16, 1937   2 Sheets-Sheet 2
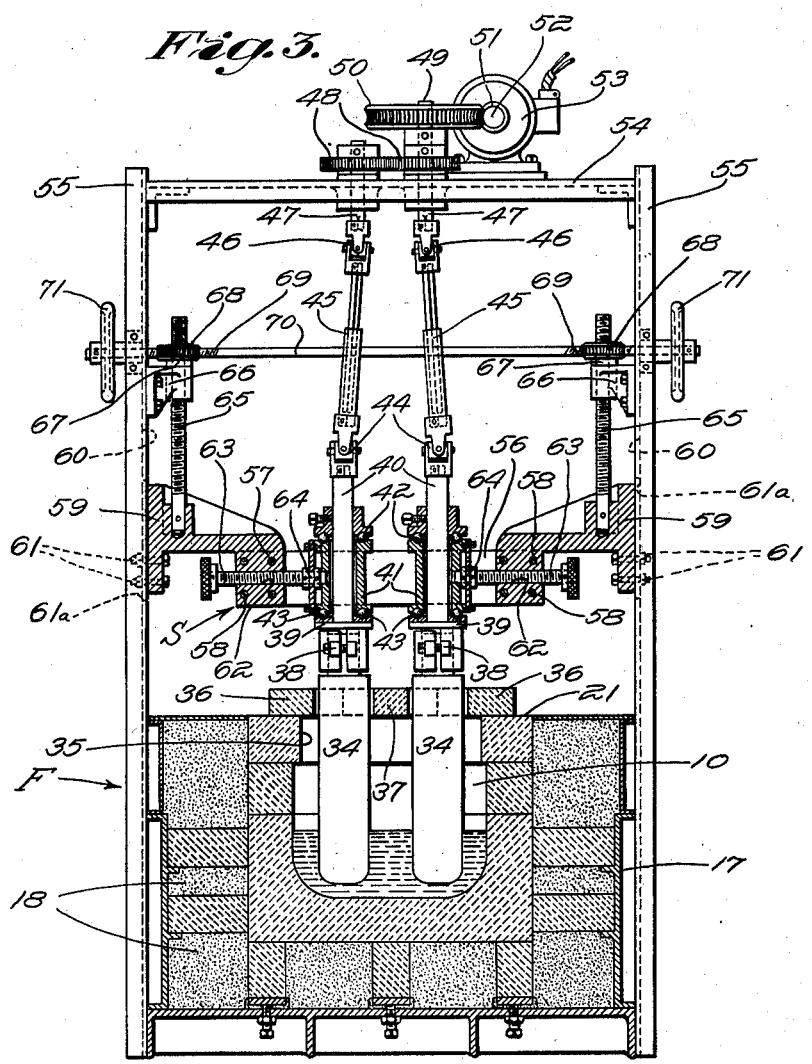
Inventor;
George E. Rowe
by Brown & Parham
Attorneys
Witness;
W. R. Thayer Patented Feb. 6, 1940

2,189,271

UNITED STATES PATENT OFFICE 2,189,271

FOREHEARTH FOR AND METHOD OF CONTROLLING THE TEMPERATURE AND CONDITION OF MOLTEN GLASS

George E. Rowe, Wethersfield, Conn., assignor to Hartford-Empire Company, Hartford, Conn., a corporation of Delaware Application April 16, 1937, Serial No. 137,155

6 Claims. (Cl. 49—56)

This invention relates to forehearths for conducting molten glass from a source of supply, such as a melting tank, to a delivery chamber, such as a feed spout or basin, which may constitute the outer end portion of the forehearth and from which glass is to be fed, gathered, drawn or otherwise removed.

Glass of a supply stream in the refractory flow channel of a forehearth tends to become cooler and to flow more slowly next to the walls of the flow channel than at other places in a cross section of the stream. This causes a condition known as "channeling," since the hotter, less viscous, more rapidly flowing glass of the stream tends to form a channel in the colder more sluggish marginal portions of the stream. As a result of this condition, the glass in the delivery chamber or outer end portion of the forehearth may differ in temperature and condition in different portions thereof. Non-uniformity of temperature and condition of the glass in the delivery chamber tend to make charges of glass fed or otherwise removed from such chamber imperfect and even unsatisfactory for use in the production of glassware. "Channeling" also may cause defects, such as "cords," in the glass charges.

An object of the invention is to provide improved means for controlling the temperature and condition of the glass stream in a forehearth so as to secure substantial uniformity of temperature and homogeneity of all portions of the glass in the delivery chamber or outer end portion of the forehearth.

A further object of the present invention is to obviate or overcome "channeling" by novel, simple and efficient means and in a novel way.

According to the present invention, "channeling" and the detrimental effects thereof are obviated or overcome by providing means for stirring the glass of the stream at a substantial distance from the feeder outlet or other place at which glass is to be removed from the delivery chamber. The stirring means accelerates the rate of flow of the glass constituting the side portions of the stream and retards the rate of flow of the middle portion of the stream while at the same time causing commingling of these different portions of the glass stream to aid equalization of temperature and rate of flow throughout the cross section of the stream.

Preferably, the stirring means comprises two adjustable substantially vertical stirring implements depending into the glass in the forehearth and acting on different portions of the glass stream to perform the functions above stated. These stirrers preferably are located at opposite sides of the longitudinal median line of the glass stream in the forehearth and are adjustable vertically and independently adjustable laterally while they are in operation. The positions of the lower ends of these stirrers relative to the bottom of the glass flow channel and the positions of the respective stirrers relatively to each other and to the side walls of the glass flow channel thus may be adjusted as required most satisfactorily to meet any particular condition or varying conditions of service.

Equalization of temperature throughout the cross section of the stream by the time the glass of such stream reaches the delivery chamber or outer end portion of the forehearth may be further aided, according to the present invention. To this end, the bottom of the forehearth channel may be arranged to slope downwardly from a place in the forehearth at least as far rearwardly as that at which the stirring means is located so as to progressively increase the depth of the stream of glass after different portions thereof have been acted on by the stirring means. The increase of depth of the stream of glass as such stream moves toward the outer end portion or delivery chamber of the forehearth tends to aid equalization of temperature throughout such glass.

Other objects and advantages of the invention hereinafter will be pointed out or will become apparent from the description of a practical embodiment of the invention, as shown in the accompanying drawings, in which:

Figure 1 is a fragmentary horizontal sectional view of a forehearth equipped with glass stirrers and constructed according to the invention, the section being taken on the line 1—1 of Fig. 2;

Fig. 2 is a fragmentary longitudinal vertical section through the same forehearth, the section being substantially along the longitudinal median line of the forehearth, as indicated by the line 2—2 of Fig. 1;

Fig. 3 is a transverse vertical section through the forehearth, taken substantially along the line 3—3 of Fig. 2, and showing also adjustable mechanism for supporting and operating the glass stirrers.

In the drawings, a forehearth generally designated F comprises a section 10, the outer end portion or delivery chamber of which, designated 11, may be a feed spout having a feed outlet 12 in its bottom. The section 10 is generally termed the homogenizing or heating section of the forehearth.

The forehearth also may include a rearward section 13, generally termed a cooling section, which is partially separated from the homogenizing section 10 by a transverse refractory partition or separator block 14. Only the outer end portion of the rearward section 13 of the forehearth is shown since this portion of the forehearth may be constructed in any suitable known way and equipped with any suitable known means for controlling the temperature of the portion of the glass supply stream therein. It will be understood that in actual practice, the section 13 will be so located with respect to a source of supply of molten glass, such as a melting tank (not shown) that glass will tend to flow continuously in a stream from the source of supply through the section 13 and beneath the separator block 14 into the section 10.

In structure, the forehearth may comprise a refractory channel, such as indicated at 15, in which the glass flows, the outer end portion of this refractory channel consisting of a refractory body portion 16 of the glass feed spout. The refractory channel 15 is suitable supported in a metallic casing 17 and is adequately insulated at its bottom and sides, as by insulating material 18. The refractory member 16 at the outer end of the glass flow channel likewise may be housed within a metallic casing, designated 19, and suitably insulated, as by the insulating material 20. The details of the means for supporting and insulating the refractory glass containing members of the forehearth do not per se form part of the present invention and therefore need not be further described. In fact, the forehearth may be constructed and supported externally in any suitable known manner and by the use of any suitable known means.

The forehearth also includes a suitable refractory cover structure 21, preferably including a flat top for the forehearth as shown by Figs. 2 and 3 of the drawings. The outer end portion of this cover structure is suitably formed to provide a cover, indicated at 22, Fig. 2, for the feed spout member 16. A suitable casing, indicated at 23, may be provided for this portion of the cover structure of the forehearth and insulation may be provided therefor, as indicated at 24. The sides of this cover structure also may be suitably encased and insulated as will be clear from the showing of Fig. 3.

Burner ports 25 may be provided through the side walls of the forehearth above the level of the glass therein. Heat may be applied to the glass in the homogenizing section of the forehearth by suitable burners, which may be associated with the burner ports 25 in any suitable way and may have any suitable known construction and mode of operation.

Vents, designated 26 are provided in the cover structure of the forehearth and may be dampered, as by means of the adjustable refractory blocks 27. Any other suitable known means may be employed to apply heat to the glass in the homogenizing section of the forehearth and/or regulably to control the temperature and pressure conditions therein.

The feeding of glass from the delivery chamber through the feed outlet 12 may be controlled by suitable known means, such as a well-known feeding mechanism that includes a refractory plunger 28 and a refractory tube 29. This refractory tube may be lowered to the curb at the upper end of the outlet to shut off flow of glass to the outlet, as shown in Fig. 2. During feeding, however, this tubular member 29 will be disposed with its lower end at a predetermined distance above the upper end of the outlet to regulate the flow of glass from the delivery chamber to the outlet. It will be understood that in practice suitable means (not shown) will be provided for supporting and operating these feed controlling members.

Referring particularly to Fig. 2, it will be noted that the glass stream may be relatively shallow, as indicated at 30, as it passes beneath the separator block 14 to the homogenizing section 10 of the forehearth. The depth of the stream then is progressively increased, as by forming the bottom wall of the refractory channel 15 so that it is downwardly inclined, as indicated at 31, from approximately the juncture of the homogenizing section 10 with the rearward section 13 to the delivery chamber or outer end portion of the forehearth. The bottom of the latter may be substantially horizontal, as indicated at 32. With this arrangement, the body of glass in the delivery chamber, indicated at 33, is relatively deep as compared with the stream of glass entering the homogenizing section 10.

The stirring means may comprise a pair of substantially circular refractory stirrers 34 which depend through a suitable transverse aperture 35 in the forehearth top so that their lower end portions dip into the glass in the rear portion of the homogenizing section 10. The respective stirrers are located at opposite sides of the longitudinal median line of the forehearth channel and the lower end portions of the stirrers may depend in the glass nearly to the bottom wall of such channel, as best seen in Fig. 3. The stirrers are located a substantial distance rearwardly of the flow channel from the feed outlet. In the structure shown, this distance is approximately twice the width of the delivery chamber at the feed outlet.

To minimize loss of heat through the transverse aperture 35 and at the same time to permit lateral adjustments of the respective stirrers 34, a suitable closure for such aperture may be provided and may comprise movable refractory end blocks 36 and a middle block 37. Adjacent portions of these blocks are suitably formed to fit rather closely around the substantially circular stirrers 34.

The stirrers 34 may have stems at their upper ends by which they may be detachably secured, as by the chucks or clamps 38 to flanged lower end portions 39 of vertical shafts 40. These shafts 40 are rotatably supported in vertical sleeves 41, as by upper anti-friction bearings 42 and lower anti-friction bearings 43, the arrangement being such that the shafts 40 are held against endwise movement in the sleeves 41 but may turn freely therein. The upper ends of the shafts 40 are connected by universal joints 44 with other shafts 45, each of which comprises cooperative telescopically engaged sections splined together so that these sections will rotate in unison, but are longitudinally movable relative to each other to vary the effective length of the complete shaft 45. The upper ends of the upper sections of the shafts 45 are connected by universal joints 46 with short vertical stub shafts 47, which carry pinions 48. The respective pinions 48 are enmesh with each other.

One of these shafts 47 may have an upward extension, as indicated at 49. This extension carries a worm wheel 50 in mesh with a worm 51 on a shaft 52 that receives motion from a motor 53 or other suitable source of power. A suitable speed reduction unit may be included in the assembly. This driving mechanism for rotating the shafts 47 and the parts connected therewith may be supported on a cross frame 54 which may be carried by standards 55, located at the sides of the forehearth structure.

In the arrangement just described, the stirrers 34 are rotated in opposite directions, preferably in the directions indicated by the arrows in Fig. 1. This will impel the glass between the stirrers and the side walls of the forehearth channel forwardly, while at the same time tending to retard forward movement of the portion of the glass that is moving in the forehearth channel between the stirrers and also tending to effect a mixing or commingling of the glass of the stream in directions having components extending transversely of the stream.

In order to meet to the best advantage different conditions of or affecting the glass at different times, it is desirable to have the stirrers 34 adjustable, both vertically, to vary the depth thereof in the glass, and laterally to vary the distance between the stirrers and the side walls of the glass conducting channel. The bearing sleeves 41 may have flanges at their upper and lower ends, as shown in Fig. 3, whereby they will be supported for lateral adjustment between and by side members of a vertically adjustable supporting frame, generally designated S. Only one of these side members of this frame S is shown, being indicated at 56, but it is obvious that this is but one of a pair of similar side members, both of which are attached, as at 57, to the end members 58 of the frame S. The end members 58 of the frame S are in the form of castings having bracket portions 59 slidable vertically in guideways 60 in the standards 55 and adapted to be secured to such standards in vertically adjusted positions, as by the fastening devices 61. The fastening devices 61 extend through vertical slots 61a in the guideway portions of the standards 55.

The end members 58 are provided with threaded openings 62 which are engaged by threaded adjusting rods 63. The inner ends of these threaded rods are pivotally connected, as at 64, with the bearing sleeves 41. Each bearing sleeve 41 and the stirrer 34 suspended therefrom thus may be moved laterally along the slot between the side members of the frame S by adjustment of the threaded rod 63. Such adjustment of the threaded rod 62 may be conveniently effected by manipulation of the knurled head that is provided at the outer end thereof. Of course, the sections 37 and 36 of the closure for the lateral aperture 35 in the top of the forehearth will be moved as required when a lateral adjustment of either or both of the stirrers has been effected.

For adjusting the stirrers vertically, I may make use of vertical adjusting rods 65, Fig. 3. The lower ends of the rods 65 may be secured in sockets in the end members 59 of the frame S. The rods 65 have threaded portions extending slidably through vertical openings in brackets 66 which are secured to the standards 55. Adjusting nuts 67 in threaded engagement with the rods 65 rest upon the brackets 66 and have integral worm wheel portions 68 in mesh with worm portions 69 of a cross adjusting rod 70.

The latter is journaled in bearings carried by the standards 55 and is provided at its opposite ends with hand wheels 71. Either of these may be conveniently manipulated to effect raising or lowering of the frame S and the stirrers 34 depending therefrom, assuming, of course, that the fastening devices 61 have first been loosened sufficiently to permit such adjustment.

The stirrers may be adjusted vertically and/or laterally to advantage when the pull on the glass stream in the forehearth has been changed, as when the rate of feeding of glass through the feed outlet has been changed, or when the viscosity and temperature of the glass of the supply stream have changed or been changed for any reason. The telescopic relationship of the sections of the upper shafts 45 and their universal connections with adjacent parts of the mechanism for operating the stirrers permit vertical adjustments of the stirrers and independent lateral adjustment of either stirrer during rotation thereof without a binding action at any place in the stirrer operating mechanism.

The rotation of the stirrers in the directions indicated by the arrows in Fig. 1 will accelerate the forward movement of the side portions of the glass in the side portions of the stream and will retard, at least to some extent, the forward movement of the middle portion of such glass stream. At the same time these rotary movements of the stirrers will tend to mix the different portions of glass in a cross section of the stream. The glass thus acted on moves for a substantial distance in a stream that increases progressively in depth. This also makes for equalization of temperature and homogeneity of the glass in the feed spout or delivery chamber portion of the forehearth.

The refractory tubular member 29, which in prior forehearth feeders is usually rotated, may be held stationary in vertically adjusted position, at least for certain conditions of service, when the forehearth has glass stirring and conditioning means according to the present invention.

The invention has been described particularly with reference to its use in the conditioning of glass entering a feed spout having a feed outlet in the bottom thereof. Obviously, the invention may be used to advantage for the control of the temperature and condition of glass passing along the forehearth to any other known form of delivery chamber, such as a basin for holding a body of glass from which charges are gathered in suction receptacles. Also, the invention is not to be limited by the details herein shown and described beyond the plain meaning of the terms of the appended claims.

I claim:

1. A forehearth comprising a glass flow channel having its outer end portion formed to constitute a glass delivery chamber, a pair of rotary glass stirrers depending into said channel at a substantial distance rearwardly of said delivery chamber, said stirrers respectively being located at opposite sides of the longitudinal median line of the channel, and means for adjusting said stirrers laterally to vary the distance between them and thereby to vary the glass mixing action of the stirrers on the glass in said channel.

2. A forehearth comprising a glass flow channel having its outer end portion formed to constitute a glass delivery chamber having a glass discharge outlet in its bottom, a pair of substantially vertical rotary glass stirrers depending into the glass in said channel at a place located a substantial distance rearwardly of the glass delivery chamber, said stirrers respectively being located at opposite sides of the longitudinal median line of the forehearth, means for rotating said stirrers about their respective axes, and means for adjusting said stirrers vertically relative to the bottom of said channel and for effecting a relative lateral adjustment of one or both of them to vary the distance between them.

3. A forehearth comprising a glass flow channel having its outer end portion formed to constitute a glass delivery chamber, a pair of substantially vertical rotary glass stirrers depending into the glass in said channel at a place located a substantial distance rearwardly of the glass delivery chamber, said stirrers respectively being located at opposite sides of the longitudinal median line of the forehearth, means for rotating said stirrers about their respective axes, and means for adjusting either of said stirrers laterally in said channel independently of the other stirrer.

4. A forehearth comprising a glass flow channel having its outer end portion formed to constitute a glass delivery chamber, a pair of substantially vertical rotary glass stirrers depending into the glass in said channel at a place located a substantial distance rearwardly of the glass delivery chamber, said stirrers respectively being located at opposite sides of the longitudinal median line of the forehearth, means for rotating said stirrers about their respective axes, and means for adjusting said stirrers vertically and either stirrer laterally in said channel independently of the other stirrer.

5. The method of controlling the temperature and condition of molten glass in a forehearth which comprises flowing glass in a stream from a source of supply toward a glass discharge outlet in the bottom of a glass delivery chamber at the outer end of the forehearth, accelerating the forward movement of the glass of the side portions of the stream and retarding the forward movement of the glass of the middle portion of the stream at a substantial distance from the delivery chamber, and causing the glass to move forward thereafter in a stream that is of greater depth for at least part of the remainder of the distance to the delivery chamber.

6. The method of controlling the temperature and condition of molten glass in a forehearth having its outer end portion formed to constitute a delivery chamber provided with a glass discharge outlet in its bottom, comprising the steps of flowing glass from a source of supply in a stream in said forehearth toward said delivery chamber, stirring the glass of the stream at opposite sides of the longitudinal median line thereof and at a substantial distance from said delivery chamber to effect a transverse mixing of said glass and simultaneously to accelerate the forward movement of the glass of the side portions of the stream and to retard the forward movement of the glass of the middle portion of the stream, and causing all the glass to move forward thereafter in a stream of increasing depth from the place at which said stirring has been effected substantially to said delivery chamber.

GEORGE E. ROWE.